United States Patent  [15] 3,686,763
Soe  [45] Aug. 29, 1972

[54] ARRANGEMENT IN RULING MACHINE

[72] Inventor: Hartvig Soe, Alvsjo, Sweden

[73] Assignee: Misomex Aktiebolag of Ellen Keys Gata, Hagersten, Sweden

[22] Filed: Jan. 23, 1970

[21] Appl. No.: 5,285

[30] Foreign Application Priority Data

Feb. 4, 1969 Sweden .....................1459/69

[52] U.S. Cl. ..................................33/19 A, 33/23 C
[51] Int. Cl. ...............................................B43l 13/24
[58] Field of Search ...33/32, 18 R, 18 C, 23 B, 23 G, 33/23 C, 32 R, 32 C

[56] References Cited

UNITED STATES PATENTS

| | | | |
|---|---|---|---|
| 2,638,671 | 5/1953 | Ramsey | 33/18 R |
| 1,142,585 | 6/1915 | Lane | 33/23 C |
| 222,271 | 12/1879 | Hamilton | 33/77 |
| 3,212,194 | 10/1965 | Brault | 33/125 T |

FOREIGN PATENTS OR APPLICATIONS

| | | | |
|---|---|---|---|
| 1,330,264 | 5/1963 | France | 33/18 R |

Primary Examiner—Harry N. Haroian
Attorney—Larson, Taylor and Hinds

[57] ABSTRACT

In a ruling machine of the type in which a recorder pencil is carried by a carriage which is moved in accordance with a scanner, an arrangement for enlarging or reducing the distance travelled by the recorder pencil relevant to the scanner to thereby counteract distortions which would otherwise arise when the pattern made by the recorder pencil is stretched as when mounted on a cylinder of a printing press. A threaded shaft extends in the direction in which enlargement or reduction is to take place, a nut threadedly but non-rotationally engages the shaft for movement therealong and a projection from the carriage extends into the path of travel of the nut and is urged thereagainst by a spring. A wedge member is positioned between the projection and the nut. This wedge member rides along a guide bar to vary its position between the nut and the projection so that the distance between the nut and the projection varies as the nut travels along the shaft.

10 Claims, 4 Drawing Figures

ARRANGEMENT IN RULING MACHINE

In my copending application Ser. No. 799,063, filed Feb. 13, 1969, now U.S. Pat. No. 3,562,914, issued Feb. 16, 1971, a ruling machine for forming a reproduction of any kind of a rectangular master pattern is shown and described, said ruling machine comprising a scanner for scanning every single line of a master pattern attached to a pattern table, a recorder connected to said scanner for drawing lines onto a recording blank corresponding to the scanned lines of the master pattern and an electronic device co-ordinating said scanner and said recorder for receiving and treating information of the location and the length of the scanned line coming from the scanner and in correspondence to said treated information forcing the recorder to execute its drawings, whereby the scanner and the recorder are each separately moveable in two directions perpendicular to each other. For convenience, these two directions are referred to hereinafter as the vertical and the horizontal directions.

The various means of the ruling machine are thereby so formed and so connected to each other that the recorder will positively reproduce the scanned line in the horizontal direction as well as in the vertical direction.

The ruling machine has found a great employment in the formation of foils intended to be used as originals for being printed down onto a printing plate having a light sensitive layer preferably for a rotary printing machine. In printing the original down onto the plane printing plate one will receive an exactly sized picture of the master original on the printing plate. In bowing the printing plate around a cylinder of the printing press used therefor there will however be some size elongation along the periphery of the printing plate due to the thickness of said printing plate, i.e., along the surface thereof, onto which the printing picture was copied down. This size elongation or traction will only take place in the direction of the bowing and not at all in the axial direction of the cylinder, and a size difference between the pattern original and the reproduction thereof formed in the printing press will arise in the bowing direction of the printing plate while on the contrary there will be an exact correspondence in the axial direction of the printing cylinder. The expansion of the printing plate in the bowing direction and the size difference connected thereto will be further increased in locking-up the printing plate on the cylinder, which locking-up will usually take place by means of hooks engaging the printing plate and clamping it in the bowing direction of the plate.

One has previously tried to eliminate the disadvantages of the size differences arising due to the bowing and locking-up of the printing plate in the bowing direction by drawing the master pattern in one direction, for instance the vertical direction in somewhat less scale than the scale wanted to be reproduced after the printing, while it will thereabout be drawned in full scale in the horizontal direction. This will of course be exacting, time consuming and expensive.

Also other methods and arrangements have been proposed for eliminating the above mentioned disadvantages, but the majority of such methods or advantages hitherto known are expensive and exacting. Therefore the present invention is intended to remove the said shortcomings and disadvantages and to provide an arrangement in a ruling machine of the kind mentioned in my said earlier patent, by means of which the reproduction scale of either or both reproduction directions may be reduced or increased after need, and which arrangement does consequently not pre-suppose any specially formed master pattern.

In my said earlier patent, it is described how the recorder pencil in ruling in one direction or the other will automatically adjust itself in accordance with a predetermined modulus, that is one-tenth inch in the vertical direction and one-eighth inch or one-half inch in the horizontal direction. It has however been shown that there may in certain cases be a need of executing a ruling at one or more points between the fixed steps of the modulus, and the invention therefore also relates to a modified embodiment of a holder for the recorder pencil, which will admit a manual displacement of the recorder pencil in order that it will take the intended position between two lines of the fixed modulus system.

Objects and advantages of the present invention will become apparent from the following detailed description of a preferred embodiment of the invention which is to be read together with the accompanying drawings.

Figure 1:
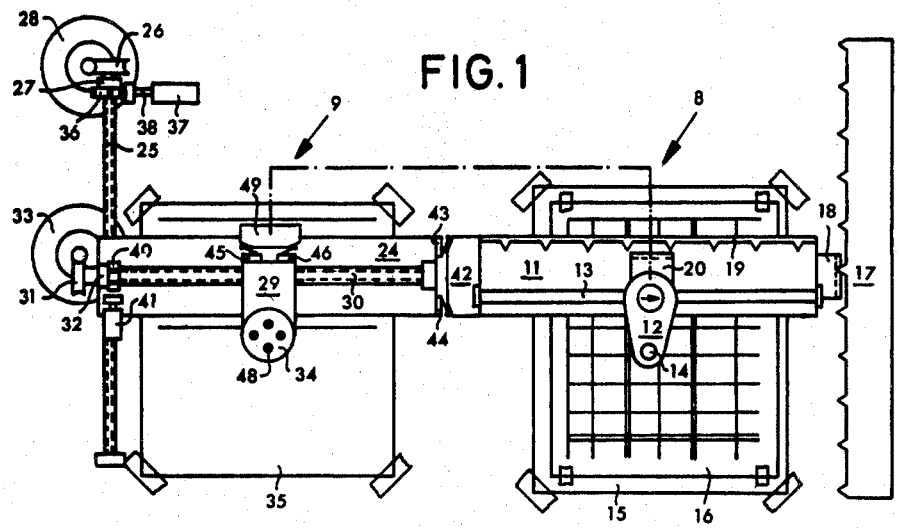
FIG. 1 is a schematic plan view of a ruling machine as shown in my said earlier patent.

In the drawings and in the following detailed description, where applicable, the reference numerals used in my said earlier patent are used herein to show the same or analagous members.

Figure 2:
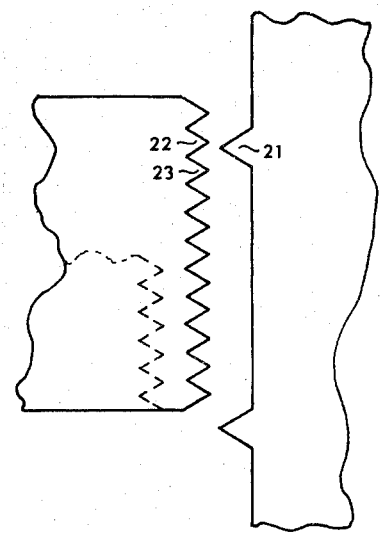
FIG. 2 shows a detail of FIG. 1 on an enlarged scale.

The ruling machine according to FIGS. 1 and 2 includes a scanner in the drawings generally indicated by the reference number 8 and a writer, which is in the drawings generally indicated by the reference number 9. The scanner 8 and the writer 9 are freely movable independently of each other, but for the coordination of said two devices there is an electronic device, not shown herein but described in my said earlier patent.

The scanner 8 comprises a parallel movable carriage 11, which is displaceable in one direction, which direction will, for the sake of simplicity, be called the vertical direction. On said carriage 11 a slider 12 is displaceably guided by a guide rod 13 or any similar means. The guide rod 13 is mounted perpendicularly to the moving direction of the carriage 11, so that the slider 12 will be displaceable perpendicularly to said moving direction. The slider 12 is in its outer end provided with a scanner pin 14, which may be a ball pencil. The carriage 11 together with the slider 12 rides over a draft table, onto which the pattern draft 16 may be attached. For facilitating the attachment of the pattern draft 16 in such a way onto the draft table, that the lines thereof will run substantially parallel to the moving directions of the scanner carriage 11 and the scanner slider 12 respectively, one can first attach to the draft table a crossruled pattern 15 of a predetermined design and the pattern draft 16 is thereupon mounted above the cross-ruled pattern 15 such that the horizontal and vertical lines thereof will run parallel to the corresponding lines of the square pattern 15. For facilitating the attachment of the pattern draft onto the square pattern the draft table may be formed as a light table, so that the pattern draft 16 can fit to the square pattern 15 by a simple translucent of the square pattern and the draft. Instead of using a square pattern the draft table may be provided with two engravings perpendicular to each other and corresponding to the moving directions of the scanner carriage 11 and the scanner slider 12 respectively, and in attaching the pattern draft onto the draft table it is only fit against said positioning lines.

For facilitating a reproduction of the vertical and horizontal lines of the pattern draft 16 there is a vertical locking means engaging the carriage 11 and a horizontal locking means engaging the slider 12. The vertical locking means includes a rack 17 running in the moving direction of the carriage 11 and a cog or a second rack 18 attached to the carriage 11 and adapted to be forced into engagement with said first mentioned rack 17.

The horizontal locking means of the scanner includes like the vertical locking means thereof a rack 19, which is attached to the carriage 11, and which may effectively engage a cog or a rack 20, which is in turn attached to the slider 12.

The racks 17 and 19, which are substantially identical, are formed with teeth, as for instance 21, see FIG. 2, said teeth 21 being spaced but disposed on a line. The racks 18 and 20 are thereagainst formed with continuous saw-toothed shape, where each tooth such as 22 or 23 has substantially the same form and magnitude as the teeth 21 of the racks 17 and 19.

Instead of forming the horizontal and vertical locking means respectively as two racks engaging each other, the fixed racks 17 and 19 respectively can be formed with continuous saw-tooth shape, while the locking means engaging said saw-tooth shaped rack may be formed as one single tooth.

Sometimes it is necessary or suitable to be able to reproduce a line which is disposed between two lines of the predetermined square pattern, and in a modification of the locking mechanism shown in FIG. 2 the movable rack 18 or 20 respectively is for this purpose formed as two alternatively engageable racks, which are mutually displaced a distance corresponding to half the distance between two adjacent teeth as for instance 22, 23. This has been indicated by the broken lines of FIG. 2. If thereby the rack indicated by the continuous lines is normally utilized the rack marked with the broken lines may in reproducing an intermediate line be brought into engagement with the tooth 21 of FIG. 2 instead of the rack marked with the continuous line, whereby the drawing pencil 14 will be disposed exactly intermediate to adjacent lines of the square pattern.

The pitch between the teeth 21 of the racks 17 and 19 and the teeth 22, 23 of the racks 18 and 20 respectively may be adapted according to the circumstances. The accepted standard of vertical and horizontal step movement is, for instance, in computers, fractions of an inch, so the pitch between the teeth 21 of the racks 17 and 19 has been chosen to be exactly one inch. The step displacement in one direction in a computer is one/tenth inch, and consequently the pitch between the teeth 22, 23 of the rack 18 has been made exactly one/tenth inch. Thus the carriage 11 can be displaced 10 steps of each one/tenth inch in the vertical direction during engagement between the rack 18 and one and the same tooth 21 of the rack 17. The carriage has thereby moved 1 inch, and at the next step it starts a new series of engagements with the next adjacent tooth.

The pitch between the teeth of rack 19 are likewise exactly 1 inch, but in this case the standard of step displacements in computers are one/eighth or one/twelfth inch, and consequently the pitch between the teeth of the rack 20 has been chosen to be one/eighth or one/twelfth inch.

The writer 9 includes like the scanner 8 a carriage 24, which is parallelly movable in the vertical direction. The vertical displacement of the carriage is effected by means of a threaded shaft 25 via a worm gearing 26 and a clutch 27 operated by an electric motor 28. The shaft 25 engages a nut mounted to the carriage 24, so that a rotation of the shaft 25 in one direction or the other will effect a vertical displacement up or down of the carriage 24.

A slider 29 is mounted on the carriage 24 and is movable along the carriage in a direction which is exactly perpendicular to the moving direction of the carriage 24. The slider 29 is like the carriage 24 operated by a threaded screw 30 engaging a nut mounted in the slider 29 and via a worm gearing 31 and a clutch 32 being operated by an electric motor 33.

In the free end of the slider 29 extending out of the carriage 24 it is provided with a carrier 34 for a scriber pin, an ink pencil, a knife or the like, said tool being intended to execute the actual reproduction work.

Like the carriage 11 of the scanner, the carriage 24 of the writer is movable over a table whereupon a blank 35 can be attached, onto which the line pattern is to be drawn.

Figure 3:
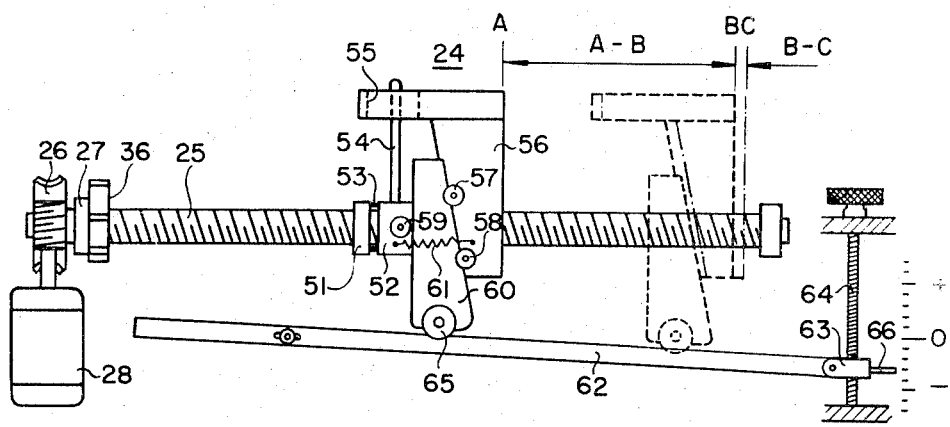
FIG. 3 is a schematic elevational view showing the improvement of the present invention.

In FIG. 3 there is shown the recorder carriage 24 with the means connected thereto for its vertical displacement seen from the side, whereby certain parts have been excluded for the sake of clarity. The recorder carriage 24 is in the conventional manner mounted for a displacement parallel to a table, onto which a recording blank is attached. For enabling the displacement of the carriage 24 there is provided an electrical motor 28, which drives a threaded shaft 25 over a worm gear 26 and a sliding clutch 27. The shaft 25 is mounted parallelly to the recorder table, and it is at one end provided with means 36 as described in my said earlier patent for stepwise fixed locking thereof in correspondence to a certain pre-determined modulus for the vertical displacement steps of the recorder carriage 24. The screw threaded shaft 25 coacts with a nut including two nut disks 51, 52 somewhat axially spaced, which are biassed from each other by means of a number of pressure springs 53 engaging between the two parts 51 and 52. The intention of the nut being divided into two parts and the pressure springs acting therebetween is to eliminate any actual play of the nut, so that a fully exact axial displacement may take place of the nut in correspondence to the rotation of the screw shaft 25. For preventing the nut to rotate together with the screw shaft it is formed with a projecting pin 54 extending through a slot 55 of the recorder carriage 24. The slot 55 is of such a length that the pin 54 may be moved some distance in the axial direction of the shaft 25 for a purpose which will be explained below.

The recorder carriage 24 is provided with a downwardly extending projection 56 located aside of the screw shaft 25 and extending a distance down thereof. The edge of the projection 56 turned towards the nut 51, 52 is wedgeformed together preferably towards its rear edge, and it is close to the said wedge edge provided with two guide rollers 57 and 58 one located in a vertical plane somewhat above the screw shaft 25 and the other a corresponding distance underneath said shaft. The nut part 52 is on its outside formed with a corresponding guide roller 59 located on axial line with the guide rollers 57 and 58 but in a vertical plane about halfway them between. Between the guide ruler 59 and the rollers 57 and 58 there is a wedge 60 the edge thereof contacting the guide roller 59 is vertical, while its edge contacting the guide rollers, 57 and 58 forms the same angle with the vertical plane as the imaginary line between the centers of the two guide rollers 57 and 58. Between the nut part 52 and the projection 56 but free from the wedge 60 a tension spring 61 is extending the purpose of which is to resiliently pull the projection 56 and the nut 51, 52 in a direction towards each other. Thereby a good contact is also obtained between the wedge 60 and the guide rollers 57, 58 and 59.

On a vertical plane with the wedge 60 there is a guide 62 located under the wedge preferably in the form of a bar or a cube and which extends from the inner end of the screw shaft 25 to a point somewhat outside its outer end. The guide bar 62 is pivotably mounted about a horizontal axis close to the end thereof located at the inner end of the screw shaft, and it is at its other end formed with a nut 63 which is link connected to the guide bar 62 over a horizontal pin. Through the nut 63 a screw 64 extends which at its top is formed with a head axially fixed at a part of the ruling machine. A rotation of the screw 64 will consequently cause a raising or a lowering of the outer end of the guide bar 62 and a following change of its horizontal position. The wedge 60 is for this purpose formed with a lower traversing wheel bearing against the upper side of the guide bar 62 thereby preventing the wedge 60 from falling out of the key-groove which is being formed by the easily running guide rollers 57, 58 and 59. The wedge 60 may while resting against the guide bar 62 be moved upwards or, due to the tension spring 61 forcing the guide rollers 57, 58 and 59 against the wedge, downwards within said key-groove. A gradual displacement upwards of the wedge will cause a gradual increase of the distance between the nut 51, 52 and the recorder carriage 24, and a gradual displacement downwards along the guide bar 62 will cause a gradual decrease of the distance between the nut and the recorder carriage. The slider nut 63 of the guide bar is preferably formed with an indicator 66 co-operating with a scale for indicating the horizontal position of the guide bar 62. The scale may have any suitable graduation, but the position has to be indicated where the guide bar 62 is running fully parallel to the threaded shaft 25, where no displacement upwards or downwards of the wedge 60 will take place in moving the recorder carriage and the means connected thereto along said threaded shaft. In this case the recording scale is 100 percent, i.e. neither a reducing or a enlarging will take place of the scanned line. In the drawings the upper half of the scale has been marked with a plus-sign and its lower half with a minus-sign what should indicate an enlarging or reducing resp. of the scanned line. Preferably the graduation is made in percent of full recording scale.

In the drawings there is shown the principle of the function of this arrangement, and as set up, it will provide a reduction of the scanned line in the vertical direction, i.e. upon a displacement of the recorder carriage 24 by means of the threaded shaft 25. At a rotation of the shaft 25 in such a direction that the nut 51, 52 will be moved outwards the wedge 60 will at the same time gradually be moved somewhat downwards with respect to the recorder carriage, and the recorder carriage will in turn be pulled closer to the nut by the tension spring 61. At a displacement of the nut 51, 52 a length corresponding to the distance A —C in the drawings the recorder carriage 24 will only be moved the distance A —B due to the displacement downwards of the wedge 60 out of the key-groove. A displacement of the recorder carriage 24 a distance A —C would correspond to full recording scale, and such a displacement will be obtained when the indicator 66 is adjusted so as to point at the marking "0" of the indicator scale. The displacement now executed by the recorder carriage is the distance B —C shorter than the displacement of the nut and corresponds to the preadjusted reducing. When the reproduction of the master pattern is finished a printing plate will have been made by means of a reproduction just finished, and in bowing and locking the printing form on the printing cylinder it is presumed that the outer periphery of the printing form will stretch a distance corresponding to the percentage reducing in the reproduction of the master pattern, so that the printed copy will be a true size copy of the master original in the horizontal direction as well as in the vertical direction.

Figure 4:
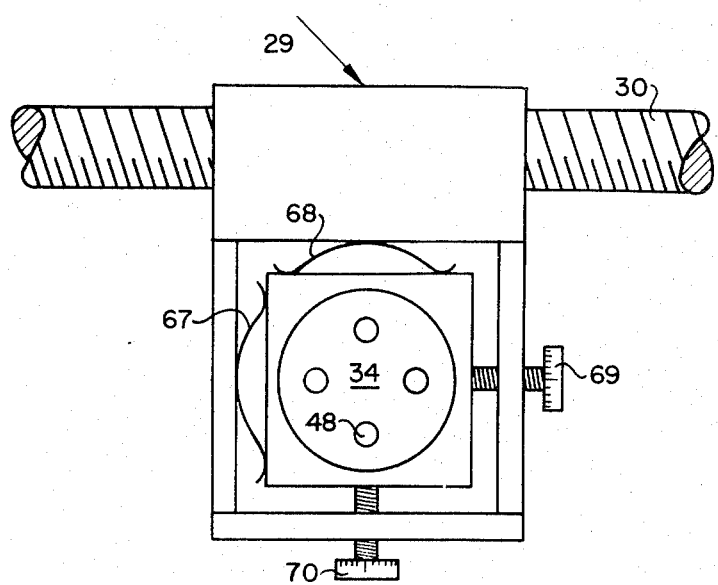
FIG. 4 is a plan view of another improvement of the present invention.

In FIG. 4 there is schematically showed a modified embodiment of a recorder slider 29 for a ruling machine according to my said earlier patent having a holder 34 for a recording pencil 48 or the like. The holder 34 is in the direction parallel to the axial direction of the screw shaft 30 displaceably mounted in a guide, and it is in a direction at right angle thereto displaceably mounted in a second guide. The holder is by means of two leaf springs 67 and 68 resiliently mounted in its guides, and the displacement may be caused by means of two set screws 69 and 70, which are threaded into some part of the recorder slider 29 and are resting against the holder 34 at the side thereof being opposite the side provided with the leaf springs. The screws 69 and 70 are preferably graded in units of the modulus for the pre-determined step displacement and there is preferably an indication on the recorder slider corresponding to the screw scale. In a preferred embodiment of the invention the screws 69 and 70 have been formed with a pitch of thread corresponding to a step displacement of half a modulus, and the screw scale is formed with ten indicator points. A rotation of the screw one point thus corresponds to a step displacement of one/twentieth modulus.

It is obvious to the man skilled in the art that the described and showed arrangements are only to be considered as explanatory examples, and that all kinds of modification may occur within the scope of this invention.

What I claim is:

1. A ruling machine comprising: a recorder carriage movable along at least one direction and supporting a recording means movable therewith to record a line in said direction; a control means for either enlarging or reducing the distance of travel of the carriage in said direction relative to a reference distance, said control means comprising, a threaded shaft extending in said direction, a nut threadedly engaging the threaded shaft and means for preventing rotation of the nut about its axis such that the nut moves along the shaft when the shaft is turned, a projection fixedly connected to the carriage and extending across the path of the threaded nut as the latter moves along said threaded shaft, a spring urging the nut and projection towards each other, a wedge member located between said nut and said projection and arranged such that when moved across the space between the projection and the nut, it enlarges or reduces the distance between them, and a guide means for varying the position of the wedge across the space between the projection and the nut and hence also varying the distance between the projection and the nut as the nut moves along the threaded shaft, whereby when the nut is moved along the shaft a distance corresponding to the reference distance, the recorder carriage will move with the nut but for a distance greater or less than the said reference distance.

2. A ruling machine according to claim 1, wherein said guide means comprises a bar extending in generally the same direction as the threaded shaft, said wedge positioned against and movable along said bar.

3. A ruling machine according to claim 2, including means for varying the angular orientation of the guide bar relative to the threaded shaft and thereby varying the amount of increase or decrease of travel between the nut and the carriage as the nut moves along the threaded shaft.

4. A ruling machine according to claim 3, said wedge member having its narrow end facing upwardly and the bottom thereof resting on said guide bar, said varying means comprising a pivot connection at one end of the guide bar and a nut at the other end thereof threadedly engaging a screw for raising and lowering said other end of the guide bar to turn it about said pivot connection.

5. A ruling machine according to claim 4 wherein the means for preventing the nut from rotating comprises a pin fixed to the nut and extending upwardly therefrom and engaged in a slot in the carriage which slot is elongated in the said direction of travel.

6. A ruling machine according to claim 4, wherein the wedge member is kept in position between the said projection and the said nut by means of at least three cooperating guide rollers, two of which rollers are mounted in the said projection of the carriage, and the other of which is mounted in the said nut.

7. A ruling machine according to claim 6, including a wheel mounted in the bottom of the wedge member and engaging the guide bar.

8. A ruling machine according to claim 1, wherein the recording means is a recording pencil, and including means for manually displacing this pencil either in said direction of travel or perpendicular thereto.

9. A ruling machine according to claim 8, wherein said recording pencil is mounted in a holder which is displaceable manually in said two directions by means of set screws arranged perpendicular to each other, each set screw urging the said holder in one of said perpendicular directions against the action of biasing means.

10. A ruling machine according to claim 9, wherein said machine includes a main indexing means having a certain pitch; and wherein the said screws are formed with threads of a pitch such that one full rotation of each set screw corresponds to one whole unit of the said certain pitch, and including markings on the thread screw.

* * * * *